(12) United States Patent
Ketchel et al.

(10) Patent No.: US 8,613,556 B2
(45) Date of Patent: Dec. 24, 2013

(54) BEARING PROTECTION SYSTEM

(75) Inventors: Bradley Ketchel, Waterford, MI (US); Chris Katke, Redford, MI (US); Yuichiro Noro, Columbus, IN (US)

(73) Assignee: NTN USA Corporation, Mt. Prospect, IL (US)

( * ) Notice: Subject to any disclaimer, the term of this patent is extended or adjusted under 35 U.S.C. 154(b) by 22 days.

(21) Appl. No.: 13/404,091

(22) Filed: Feb. 24, 2012

(65) Prior Publication Data
US 2013/0223781 A1   Aug. 29, 2013

(51) Int. Cl.
F16C 33/80 (2006.01)
F16C 43/00 (2006.01)
F16C 43/04 (2006.01)

(52) U.S. Cl.
USPC ............................ 384/480; 384/537; 384/584

(58) Field of Classification Search
USPC ................. 384/477, 480, 488, 478, 537, 584; 464/178
See application file for complete search history.

(56) References Cited

U.S. PATENT DOCUMENTS

| 5,551,783 | A | 9/1996 | Whitney et al. |
| 6,132,099 | A | 10/2000 | Olszewski et al. |
| 6,422,947 | B1 | 7/2002 | Kelly et al. |
| 6,976,790 | B2 | 12/2005 | Min |
| 7,338,384 | B2 | 3/2008 | Patrascu et al. |
| 7,833,105 | B2 * | 11/2010 | Nagayama et al. ........... 464/178 |
| 8,012,053 | B2 | 9/2011 | Filip |
| 8,083,595 | B2 * | 12/2011 | Sanchez et al. ................. 464/17 |
| 8,123,410 | B2 * | 2/2012 | Masuda ....................... 384/448 |

FOREIGN PATENT DOCUMENTS

| JP | 2004116713 A | * | 4/2004 |
| JP | 2007127143 A | * | 5/2007 |

* cited by examiner

Primary Examiner — Phillip A Johnson
(74) Attorney, Agent, or Firm — Brinks Gilson & Lione

(57) ABSTRACT

A constant velocity joint support bearing system having a bearing assembly supporting a first shaft connected to one member of the constant velocity joint. A first labyrinth seal on one axial side of the bearing assembly is formed by a shoulder that is unitary with the outer member of the constant velocity joint and by a radially inward projection on a bearing support bracket holding in place the outer race of the bearing assembly. A second labyrinth seal is formed between a cylindrical section of the bearing support bracket and an annular member that axially retains the bearing on the first shaft. Both the bearing support bracket and the annular member are formed from stamped sheet metal. The shoulder and the annular member are shaped to promote centrifugal slinging of contaminants away from the bearing assembly.

18 Claims, 2 Drawing Sheets

BEARING PROTECTION SYSTEM

TECHNICAL FIELD OF THE INVENTION

The present invention generally relates to supports for powertrain components. More particularly, the invention relates to bearings supporting constant velocity joints.

BACKGROUND OF THE INVENTION

Front wheel drive vehicles having independent front wheel suspension use a pair of half shaft assemblies to transmit power between the vehicle's engine and the front wheels.

Typically these half shaft assemblies comprise a fixed constant velocity joint (CV joint) at one end and a plunging CV joint at the opposite end. These joints are connected by an interconnecting shaft. The fixed joint is typically positioned at the wheel side of the vehicle. These joints are designed to allow a large angle (45°-50°) of operation. The fixed joints allow the front wheels to be steered in order for the vehicle to negotiate corners.

The center of angulation of a plunging CV joint is typically positioned at the inner end of the half shaft, which is connected to a transmission or transaxle of the vehicle. This plunging CV joint is typically designed for smaller angles of articulation (20°-25"). The center of angulation of the plunging CV join is not axially fixed, but is allowed to move axially (plunge) along the axial center line of the outer member of the joint. This capability of articulation and plunge movement allow the joint to transmit power while at the same time accommodating suspension and engine movement.

A tripod joint is one design of a plunging constant velocity joint. A tripod joint comprises an outer member with three circumferentially spaced longitudinal chambers. Disposed within these chambers is a spider assembly. The spider assembly comprises a tripod member with three circumferentially spaced radially extending trunnions. Each trunnion is surrounded by a roller. Needle bearings are journaled between the roller and the trunnion. This permits free rolling of the roller on the trunnion. The outer surface of the roller is in contact with the sides of the longitudinal chambers of the outer member.

When the tripod joint is at a 0° angle, the plunging effect is relatively low. The roller rolls against the longitudinal chamber of the outer member and rotates on the trunnion of the inner member using the plurality of needle bearings.

When the tripod joint is operated at an angle, the tripod roller is not free to roll along the track because the plane of the tripod roller is skewed relative to the plane of the outer member's chamber. This skewed relationship causes the roller to both roll and slide along the longitudinal chamber. As the joint angle increases, the amount of sliding also increases.

A torque load on the tripod joint during operation at an angle larger than 0° produces a secondary moment in a radial direction with respect to the axis of rotation of the joint. This secondary torque has the tendency to change the angle of operation of the tripod joint. Therefore, an appropriate support should be provided to reduce the effect of the secondary moment.

A link shaft extends from the inner end of each half shaft to connect the half shafts to the differential coupled to the transmission. The link shaft can be a separate component or integrated with the outer member of the plunging CV joint. Ideally, the distance between the fixed CV Joint and the plunging CV Joint is identical between the right wheel half shaft assembly and the left wheel half shaft assembly. However, in vehicles with front wheel drive and a transversely mounted engine, the output of the transmission is arranged off-center, resulting in link shafts of the right wheel and left wheel having different lengths.

SUMMARY OF THE INVENTION

The present invention is based on the understanding that placing the bearing on the link shaft as close as possible to the plunging CV joint can reduce the secondary moment produced perpendicular to the axis of the CV joint when the CV joint is operated at an angle greater than 0°. Further, reducing axial space requirements for such a bearing allows constructing the link shaft to have more similar lengths on the left and right side of the transmission, enabling an arrangement of the link shaft that more closely resembles a symmetrical arrangement.

According to a first aspect of the present invention, for a driveline of the above-referenced type with an outer joint member connected to a first shaft and an inner joint member connected to a second shaft opposite the first shaft, a support bearing system comprises a bearing supporting the first shaft; and a first labyrinth seal on one axial side of the bearing with a first radially inner portion and a first radially outer portion, and the first radially inner portion being formed by a shoulder that is unitary with the outer member of the constant velocity joint.

According to a further aspect of the invention, the shoulder has a slope with a diameter increasing with increasing distance from the second shaft. This slope provides for a slinging effect that protects the bearing from contamination.

According to yet another aspect of the invention, the support bearing system has an outer bearing race retained on the first shaft by a support bracket configured to be fastened to a vehicle part. The support bracket has a radially inward projection toward the shoulder, and the projection forms the first outer portion of the first labyrinth seal.

The support bracket may be a part unitarily stamped from sheet metal.

Furthermore, the support bearing system may comprise an annular member disposed on an axial side of the bearing opposite the first labyrinth seal. The annular member may have a primarily radial collar and a primarily axial sleeve, the collar and the sleeve being unitarily connected along a connection line connecting an inner circumference of the collar to an axial end of the sleeve facing the second shaft. A radially inner portion of a second labyrinth seal may be formed by the collar of the annular member.

The sleeve may further have a retention profile at an axial end remote from the connection line with a decreased diameter configured to snap into a corresponding indentation on the first shaft.

The connection line may form a live hinge allowing for insertion of the first shaft into the annular member.

The annular member may be a unitarily stamped metal part.

The support bracket can additionally have a primarily tubular section radially outward of the annular member that forms the radially outer portion of the second labyrinth seal.

In another aspect, the invention is a constant velocity joint support bearing system for an automotive vehicle, the constant velocity joint support bearing system comprising: a driveline component including a constant velocity joint, the constant velocity joint including a first joint member and a second joint member, one of the first and second joint member being located radially outward of the other of the first and second joint members and being coupled thereto so as to rotate with and articulate relative to each other, the first joint member being connected to a first shaft and the second joint member connected to a second shaft located opposite of the first shaft; a bearing assembly supporting the first shaft, the bearing assembly including a bearing inner race and a bearing outer race, the bearing inner race being supported on the first shaft; and a labyrinth seal defined on one axial side of the bearing assembly, the labyrinth seal including a radially inner portion and a radially outer portion, the radially inner portion being a shoulder unitary formed on the first joint member, and the radially outer portion being located so as to oppose the shoulder and define a gap therebetween.

In a further aspect of the invention, the bearing outer race is supported within a radially inwardly facing surface of a support bracket that is configured to be fastened to part of the vehicle, the support bracket having a radially inward projection and the projection forming the radially outer portion of the labyrinth seal.

According to another aspect of the invention, the support bracket is unitarily a unitary stamped sheet metal structure.

As another aspect of the invention, the labyrinth seal is a first labyrinth seal and the support bearing system further comprises a second labyrinth seal disposed on an axial side of the bearing assembly opposite from the first labyrinth seal, the second labyrinth seal including a radially inner portion and a radially outer portion, the radially inner and outer portions being positioned so as to oppose each other and define a gap therebetween.

In a further aspect, the annular member is disposed on an axial side of the bearing opposite the first labyrinth seal, the annular member having a collar extending radially and a sleeve extending axially relative to the first shaft, the collar being unitarily formed with the sleeve, wherein the radially inner portion is formed by the collar of the annular member.

In still a further aspect of the invention, the radially outer portion of the second labyrinth seal is formed by a portion of the support bracket.

In still another aspect of the invention, the sleeve further includes a retention projection located generally toward an axial end of the sleeve remote from the collar, the retention projection extending radially inward from the sleeve toward the first shaft and being received within a recess formed in the first shaft.

In another aspect of the invention, the collar is connected to sleeve via a live hinge.

In a further aspect of the invention, the annular member is unitarily formed as a stamped metal part.

DETAILED DESCRIPTION OF THE DRAWINGS

Figure 1:
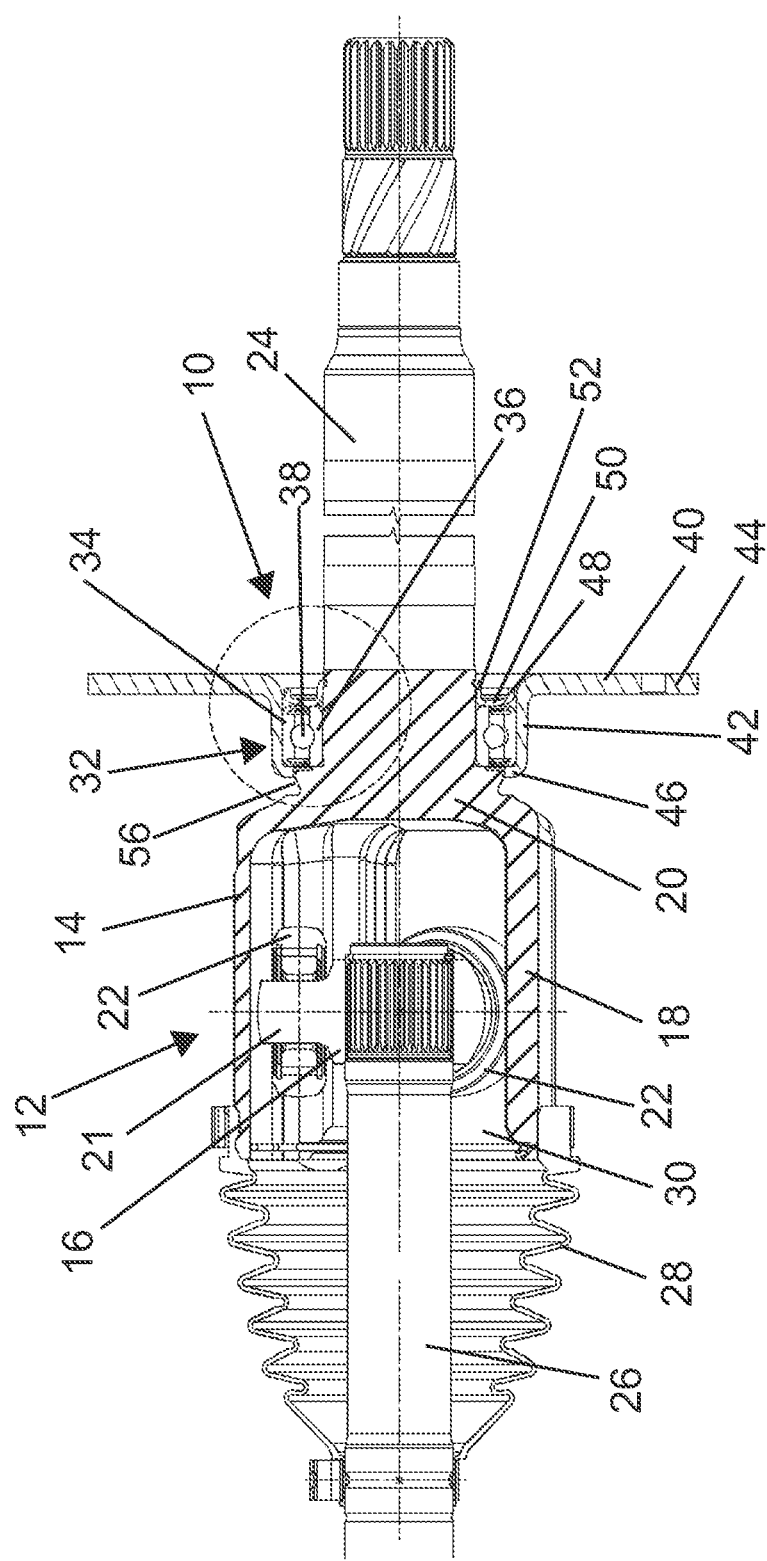
FIG. 1 illustrates a cross-sectional view of two shafts connected via a constant velocity joint and supported by an exemplary embodiment according to the principles of the present invention.
Figure 2:
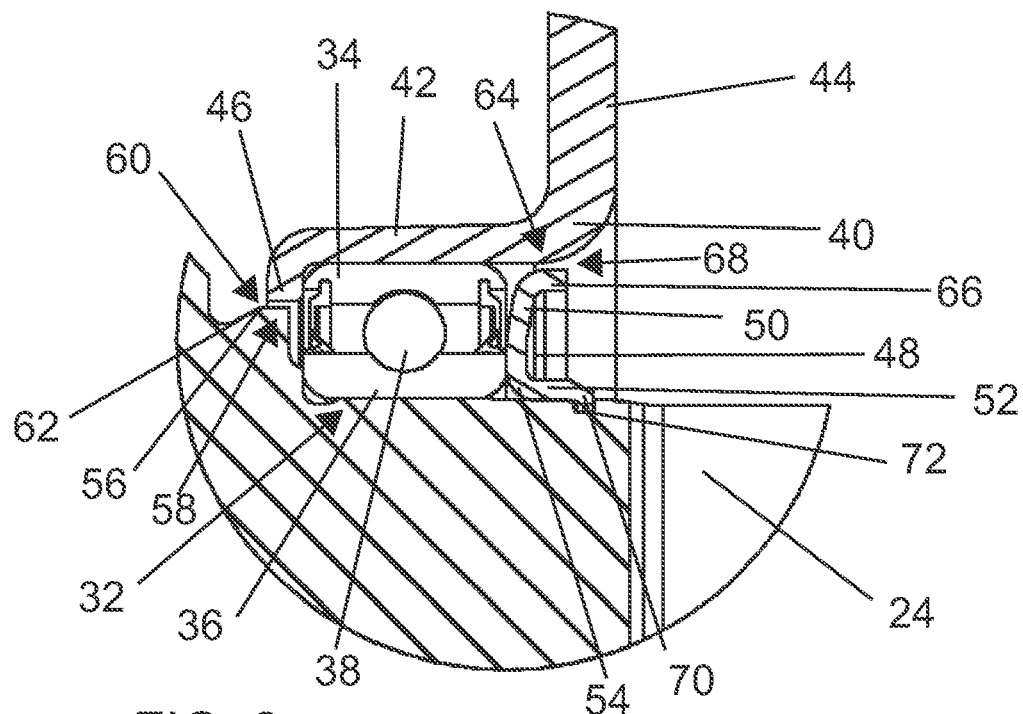
FIG. 2 shows an enlarged view of the support bearing system of FIG. 1 encircled by the broken-line portion of FIG. 1.
Figure 3:
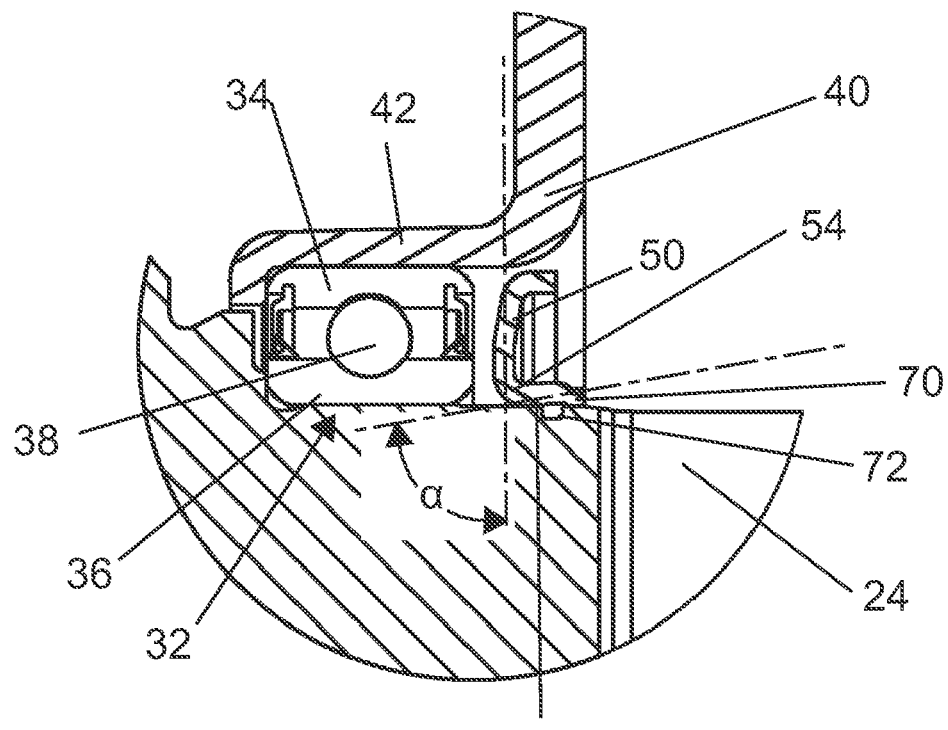
FIG. 3 shows the same view as FIG. 2, but during assembly of the annular member onto the first shaft.

FIGS. 1 through 3 illustrate an exemplary embodiment of the present invention that is described for purely illustrative purposes and that is not intended to limit the scope of the present invention. It is apparent that, while the drawings show a support bearing system 10 incorporated with a tripod constant velocity joint, a support bearing system 10 in accordance with the present invention can be implemented on any joint having an outer member.

Referring now to FIG. 1, a constant velocity joint 12 of the tripod type has an outer joint member 14 and an inner joint member 16. The outer joint member 14 is generally pot-shaped with a substantially cylindrical wall 18 and a substantially radial bottom 20. The inner joint member 16 is formed as a tripod member with three legs 21 equidistantly projecting radially outward. One of three rollers 22 is rollably mounted on each of the legs 21 via needle or other bearings.

A first shaft 24 is rigidly connected to the bottom 20 of the outer joint member 14. A second shaft 26 is rigidly connected to the inner joint member 16. A protective, flexible boot 28 covers an axial opening 30 of the outer joint member 14. The boot 28 prevents leakage of grease or lubricant contained within the constant velocity joint 12 and also prevents the entry of rain water, dirt, dust and other debris into the constant velocity joint 12.

In the shown embodiment, the outer joint member 14 is unitarily formed with the first shaft 24. It is, however, within the scope of the present invention to manufacture the outer joint member 14 and the first shaft 24 separately and to fixedly connect them with each other in a suitable manner.

Typically, in a front-wheel-drive vehicle, the first shaft 24 is configured as a link shaft leading to a differential of a vehicle transmission, while the second shaft 26 is a half shaft leading to an outer constant velocity joint of the non-plunging type. The present invention conveys benefits to such an arrangement, but is not limited to such an arrangement.

Provided within the broken-line circle of FIG. 1 is a bearing assembly 32 supporting the first shaft 24. The bearing assembly 32 includes an outer bearing race 34 and an inner bearing race 36, with the inner bearing race 36 fixedly connected or mounted to the first shaft 24, and with a plurality of rolling members depicted as balls 38. The bearing 32 may alternatively have rolling members of a different shape, such as barrels, cylindrical rollers, or others.

The outer bearing race 34 is press-fitted into a cylindrical section 42 of a support bracket 40. The support bracket 40 has a radially extending flange 44 at an axial end of the cylindrical section 42 that is remote from the constant velocity joint 12. The flange 44 is configured to be fastened to a non-suspended part of a vehicle frame. At the axial end opposite the flange 44, the cylindrical section 42 has a radially inward projection 46 embracing at least a portion of the outer bearing race 34.

Further details are visible in the enlarged detail view of the bearing support system 10 shown in FIG. 2. The cylindrical section 42 of the bearing support bracket 40 covers the entire outer bearing race 34. Opposite the radial projection 46, the cylindrical section 42 extends past the outer bearing race 34. In an axial region of the first shaft 24 that is surrounded by the cylindrical section 42, but not by the bearing 32, the first shaft 24 carries an annular member 48. The annular member 48 has a primarily radially oriented collar 50 and a primarily axially oriented sleeve 52. The collar 50 and the sleeve 52 are unitarily formed with one another, preferably of stamped sheet metal. The collar 50 transitions into the sleeve 52 along an annular line connecting the inner circumference of the collar 50 and an axial end of the sleeve 52 on the side facing the second shaft. The line connecting the collar and the sleeve defines a live hinge 54, as will be discussed in connection with FIG. 3.

The radially inward projection 46 of the support bracket 40 generally opposes a shoulder 56 formed on the outer joint member 14 in an axial area in which the outer joint member 14 transitions into the first shaft 24. The projection 46 and the shoulder 56 cooperate to define a first labyrinth seal 58 protecting the bearing 32 from contamination. A first gap 60 between the projection 46 and the shoulder 56 is narrow enough to reduce contamination and wide enough to prevent a contact between the projection 46 and the shoulder 56 when the first shaft 24 and the outer joint member 14 rotate relative to the support bracket 40.

The shoulder 58 has a contour with a slope 62 of increasing shoulder diameter in an axial direction from the outer joint member toward the first shaft 24, i.e. in a direction pointing away from the second shaft 26. The slope 62 of the shoulder 56 promotes a centrifugal slinging of dirt particles radially outward and past the first gap 60, thereby protecting the bearing 32 from contamination. Because the shoulder 56 is formed on the outer joint member 14, the support bearing system 10 requires little axial space on the first shaft 24.

This space-saving arrangement provides more freedom in the designing and packaging of driveshafts in vehicles. As such, the axial distance between the support bracket 40 and the constant velocity joint 12 can be reduced compared to known arrangements so that the first shaft 24 can be designed to be shorter than in conventional arrangements. In a driveshaft assembly of a front-wheel-drive vehicle, the resulting driveshaft assembly can be designed to more closely resemble a symmetrical arrangement compared to drive shaft assemblies with conventional support bearing systems because the link shaft can accommodate the support bearing system on a shorter axial portion.

Axially opposite the first labyrinth seal 58, the bearing 32 is protected by a second labyrinth seal 64 defined by the support bracket 40 and the annular member 48. The collar 50 of annular member 48 has a rim 66 along its outer periphery. The rim 66 substantially extends in an axial direction away from the bearing 32, primarily parallel to the sleeve 52. The rim 66 is dimensioned to leave a narrow second gap 68 between the rim 66 and the cylindrical section 42 of the support bracket 40, thereby forming the second labyrinth seal 64. The second gap 68 between the cylindrical section 42 and the rim 66 is narrow enough to reduce contamination of the bearing 32 and wide enough to prevent a contact between the cylindrical section 42 and the rim 66 when the first shaft 24 rotates the annular member 48 relative to the support bracket 40. The shape of the rim 66 of the annular member 48 also functions as a slinger by centrifugally accelerating dirt particles away from the bearing 32 during operation of the system 10.

For retaining the annular member 48 on the first shaft 24, the sleeve 52 has a retention projection or profile 70 formed at its free axial end, which is the end remote from the live hinge 54. The retention profile 70 defines a narrowed diameter for engaging an annular retention groove formed on the first shaft 24 in an axial position that is dimensioned to retain the collar 50 of the annular member 48 in axial abutment with at least the inner bearing race 36. Accordingly, the annular member axially fixates the bearing 32 on the first shaft 24.

FIG. 3 illustrates an assembly step of the support bearing system 10. After the support bracket 40 and the bearing 32 have been positioned around the first shaft 24, the annular member 48 is slid onto the first shaft 24 with the collar 50 facing or located toward the bearing 32. Because the retention profile 70 defines a inner diameter that is less than the outer diameter of the portion of the first shaft 24 where it is engaged, the profile 70 embraces the circumference of the first shaft 24 and a radial force pushes the retention profile 70 radially outward, thus giving the sleeve 52 a slightly conical expansion. The live hinge 54 is under a tension because the collar 50 and the sleeve 52 are arranged at a slightly acute angle α relative to each other. For illustrative purposes, the angle α has been exaggerated in the drawing of FIG. 3. As the annular member 48 is moved further into the axial position shown in FIG. 2, the retention profile 70 snaps into the retention groove 72. The angle α increases to a substantially right angle, and the live hinge 54 relaxes. Because the annular member 48 is an inherently resilient stamp metal part, the retention profile 70 is effectively held in the retention groove 72 by an elastic force exerted by the live hinge 54.

Because both the bearing support bracket 40 and the annular member 48 are stamped sheet metal parts, the manufacturing process for the support bearing system saves costs compared to die-cast parts.

While the above description constitutes the preferred embodiment of the present invention, it will be appreciated that the invention is susceptible to modification, variation, and change without departing from the proper scope and fair meaning of the accompanying claims.

What is claimed is:

1. A support bearing system for a driveline of the type having a constant velocity joint with a radially outer joint member and a radially inner joint member, the outer joint member connected to a first shaft and the inner joint member connected to a second shaft opposite the first shaft, the support bearing system comprising:
   a bearing supporting the first shaft; and
   a first labyrinth seal on one axial side of the bearing with a first radially inner portion and a first radially outer portion, the first radially inner portion being formed by a shoulder that is unitary with the outer joint member of the constant velocity joint and has an outer diameter decreasing with increasing distance from the bearing.

2. The support bearing system of claim 1, further comprising
   an outer bearing race, and
   a support bracket configured to be fastened to a vehicle part and retaining the outer bearing race in a radially and axially predetermined position with respect to the first shaft, the support bracket having a radially inward projection toward the shoulder, the projection forming the first radially outer portion.

3. The support bearing system of claim 2, wherein the support bracket is unitarily stamped from sheet metal.

4. The support bearing system of claim 1, further comprising:
   an annular member disposed on an axial side of the bearing opposite the first labyrinth seal, the annular member having a primarily radial collar and a primarily axial sleeve, the collar and the sleeve being unitarily connected along a connection line connecting an inner circumference of the collar to an axial end of the sleeve, the axial end facing the second shaft, and
   a second labyrinth seal with a second radially outer portion and a second radially inner portion, wherein the second radially inner portion is formed by the collar of the annular member.

5. The support bearing system of claim 4, wherein the sleeve further has a retention profile at an axial end remote from the connection line, the retention profile having a decreased diameter configured to snap into a corresponding indentation on the first shaft.

6. The support bearing system of claim 4, wherein the connection line forms a live hinge.

7. The support bearing system of claim 4, wherein the annular member is a unitarily stamped metal part.

8. The support bearing system of claim 4, further comprising an inner bearing race, the annular member being held in an axial position that is dimensioned to retain the substantially radial collar in axial abutment with at least the inner bearing race.

9. The support bearing system of claim 4, further comprising
an outer bearing race, and
a support bracket configured to be fastened to a vehicle part and retaining the outer bearing race in a radially and axially predetermined position with respect to the first shaft, the support bracket having a primarily tubular section radially outward of the annular member, thereby forming the radially outer portion of the second labyrinth seal.

10. A constant velocity joint support bearing system for an automotive vehicle, the constant velocity joint support bearing system comprising:
a driveline component including a constant velocity joint, the constant velocity joint including a first joint member and a second joint member, one of the first and second joint member being located radially outward of the other of the first and second joint members and being coupled thereto so as to rotate with and articulate relative to each other, the first joint member being connected to a first shaft and the second joint member connected to a second shaft located opposite of the first shaft;
a bearing assembly supporting the first shaft, the bearing assembly including a bearing inner race and a bearing outer race, the bearing inner race being supported on the first shaft;
a labyrinth seal defined on one axial side of the bearing assembly, the labyrinth seal including a radially inner portion and a radially outer portion, the radially inner portion being a shoulder unitarily formed on the first joint member, and the radially outer portion being located so as to oppose the shoulder and define a gap therebetween; and
a support bracket configured to be fastened to a part of the vehicle, the support bracket having a radially inwardly facing surface supporting the bearing outer race and having a radially inward projection forming the radially outer portion of the labyrinth seal.

11. The support bearing system of claim 10, wherein the support bracket is a unitary stamped sheet metal structure.

12. The support bearing system of claim 10, wherein the labyrinth seal is a first labyrinth seal and the support bearing system further comprises a second labyrinth seal disposed on an axial side of the bearing assembly opposite from the first labyrinth seal, the second labyrinth seal including a radially inner portion and a radially outer portion, the radially inner and outer portions being positioned so as to oppose each other and define a gap therebetween.

13. The support bearing system of claim 12, further comprising an annular member disposed on an axial side of the bearing opposite the first labyrinth seal, the annular member having a collar extending radially and a sleeve extending axially relative to the first shaft, the collar being unitarily formed with the sleeve, wherein the radially inner portion is formed by the collar of the annular member.

14. The support bearing system of claim 13, wherein the annular member is held in an axial position that is dimensioned to retain the substantially radial collar in axial abutment with at least the inner bearing race.

15. The support bearing system of claim 13, wherein the radially outer portion of the second labyrinth seal is formed by a portion of the support bracket.

16. The support bearing system of claim 13, wherein the sleeve further includes a retention profile located generally toward an axial end of the sleeve that is remote from the collar, the retention projection extending radially inward from the sleeve toward the first shaft so as to define a reduced inner diameter portion, the retention profile being received within a recess formed in the first shaft.

17. The support bearing system of claim 13, wherein the collar is connected to sleeve via a live hinge.

18. The support bearing system of claim 13, wherein the annular member is unitarily formed as a stamped metal part.

* * * * *